United States Patent [19]

Lewis

[11] Patent Number: 5,670,780
[45] Date of Patent: Sep. 23, 1997

[54] DEVICE PROVIDING REAL-TIME ORIENTATION AND DIRECTION OF AN OBJECT

[76] Inventor: W. Stan Lewis, 709 Mar Vista Dr., Vista, Calif. 92083

[21] Appl. No.: 421,787

[22] Filed: Apr. 14, 1995

[51] Int. Cl.$^6$ ........................................ G01D 5/34
[52] U.S. Cl. .......................... 250/231.14; 250/214 PR; 250/203.6; 244/165
[58] Field of Search ........................... 250/203.6, 231.14, 250/203.4, 203.1, 214 PR; 356/141.2, 141.5, 147, 375; 244/165, 175; 33/281, 1 N, 1 PT, 397, 534, 318, 328, 324; 364/559, 453; 354/70, 74

[56] References Cited

U.S. PATENT DOCUMENTS

| | | |
|---|---|---|
| 3,269,024 | 8/1966 | Fisher et al. . |
| 3,491,228 | 1/1970 | Selvin ................................. 250/203.6 |
| 4,047,168 | 9/1977 | Fowler ................................ 340/310.05 |
| 4,117,602 | 10/1978 | Lapeyre ................................. 33/352 |
| 4,442,723 | 4/1984 | Aver ................................... 74/5.47 |
| 4,573,651 | 3/1986 | Stanton ................................ 244/165 |
| 4,577,414 | 3/1986 | Migliori ............................... 33/363 K |
| 4,720,631 | 1/1988 | Lapeyre .............................. 250/231.18 |
| 4,902,885 | 2/1990 | Kojima et al. ........................ 250/214 PR |
| 4,977,316 | 12/1990 | Malcolm et al. ..................... 250/214 PR |
| 5,476,239 | 12/1995 | Brainard .............................. 244/165 |

OTHER PUBLICATIONS

"Sensors: Principles & Applications" Peter Hauptmann, Jan. 1991 ISBN 0138057893, pp. 32-48.

*Primary Examiner*—Que Le
*Attorney, Agent, or Firm*—Tom Hamill

[57] ABSTRACT

Disclosed is a method and apparatus for providing instantaneous real-time information concerning the attitude of an object. When the speed of the object to which the apparatus is attached is known, a real-time three dimensional velocity vector is determinable. The apparatus includes a plate mounted for rotation in a first axis nested within a gimbal means which is also mounted for rotation in a second axis, the first axis and the second axis being orthogonally oriented. The plate may mount a compass, gyroscope or laser. The rate of change of the angular position of the compass, gyroscope or laser is determinable. The rotation of the plate and the gimbal means are ascertained with precision by a novel sensor means. The sensor means determines the rotation by measuring the intensity of radiation (photoemission) passing through a disk with a variable width aperture circumscribed about the disk's circumference. Photodetectors generate a signal based on the intensity of emission which passes through the disk which is processed by appropriate means. A sensor is located to measure the rotation of the plate and a sensor is located to measure the rotation of the gimbal. The signals generated by the two sensors, plus information generated by the compass or gyroscope and the speed of the object will permit a processing means to accurately develop instantaneous changes in attitude and directional vector data. Applications include navigation, aerospace, robotics and defence.

7 Claims, 8 Drawing Sheets

DEVICE PROVIDING REAL-TIME ORIENTATION AND DIRECTION OF AN OBJECT

BACKGROUND OF THE INVENTION

1. Field of the Invention

The present invention relates generally to devices which provide real-time information concerning the orientation of an object, such as a vehicle, and more particularly, to a device which would permit the display and further processing of instantaneous real-time information concerning the changes attitude and direction of such an object.

2. Description of the Prior Art

Devices which utilize gimbal structure to determine specific directional and orientational information are well known in the navigational arts.

A typical example of such a device which incorporates a gimbal structure and a platform is U.S. Pat. No. 3,269,024 issued to Fisher et al. A gimbal supported platform is disclosed which rotates due to the action of stepper motors. The platform is designed to hold a gyroscope. The motors bring the platform into alignment with the axis of the Earth's rotation.

Another example of a device which incorporates gimbal structure is U.S. Pat. No. 4,047,168 issued to Fowler. This device utilizes a disk which is photoelectrically sensed to provide output signals which are representative of a compass heading. It is supported by a gimbal assembly which includes pivots which serve as electric terminals.

Other devices include sensor elements to determine rotation in gimballed devices. U.S. Pat. No. 4,442,723 issued to Auer discloses such a device. Sensors which determine the rotation of the gimballed elements are disclosed for navigational purposes in a gyroscopic device.

Thus, while the foregoing body of prior art indicates it to be known to use angle sensors in combination with gimballed elements supported devices such as gyroscopes or compasses, the provision of an apparatus which utilizes the novel rotation sensor of the instant invention is not contemplated. No prior art discloses a sensor which includes a slotted disk element which attenuates a photobeam generated by a photosource. No prior art considers utilizing such a simple and cost effective device to measure rotation of gimballed elements or rotating shafts in general. Nor does the prior art described above teach or suggest such a device which may provide such high resolution real-time velocity vectors of a moving object. Other advantages of the present invention over the prior art also will be rendered evident.

SUMMARY OF THE INVENTION

To achieve the foregoing and other advantages, the present invention, briefly described, provides a method and apparatus for providing instantaneous real-time information concerning the attitude of an object. When the speed and direction of travel of the object to which the apparatus is attached is known, a real-time three dimensional velocity vector is determinable. The apparatus includes a plate mounted for rotation in a first axis nested within a gimbal means which is also mounted for rotation in a second axis, the first axis and the second axis being orthogonally oriented. The plate may mount a compass, gyroscope or laser. The rate of change of the angular position of the compass, gyroscope or laser is determinable. The rotation of the plate and the gimbal means are determined with precision by a novel sensor means. The sensor means determines the rotation by measuring the intensity of radiation (photoemission) passing through a disk with a variable width aperture circumscribed about the disk's circumference. Photodetectors generate a signal, based on the intensity of emission which passes through the disk, which is processed by appropriate means. A sensor is located to measure the rotation of the plate and a sensor is located to measure the rotation of the gimbal. The signals generated by the two sensors, plus the information generated by the compass or gyroscope and the speed of the object will permit processing means to accurately develop instantaneous attitude and directional vector data.

A plate is mounted for rotation inside a gimbal means. The central plate is balanced such that the center of mass of the gimbal assembly is the center of the plate. The plate has two co-linear shafts which attach to the gimbal means. The first and second shafts are firmly affixed to the plate, the first and second shafts rotate in unison with the plate rotation. The first and second shafts rotate at the attachment to the gimbal means utilizing any of a variety of rotation means to assure free rotation. On the first shaft is located a first rotation sensor and on the second shaft is located a mass having the weight of the sensor. The first shaft passes through the center of the first rotation sensor, the first rotation sensor includes a housing enclosing a slotted disk wherein a slot is continuously varying about the circumference of the disk. The housing is generally cylindrical and includes a tubular side portion intermediate a first and second circular face. The two circular faces and slotted disk have a center. The circular faces each have co-linear apertures. The first shaft passes through the center of the two circular faces of the housing and the slotted disk. The slotted disk is fixed to rotate with the first shaft. The first circular face center includes means to permit free rotation of the first shaft. This may include a race of roller bearings, or it may be a bushing with appropriate lubrication. The second circular face is affixed to the gimbal means. A first aperture is located outside the housing on the first circular face and a second aperture is located outside the second circular face, both first and second apertures being co-linear with the slot of the slotted disk and defining a channel. A photosource is located over the first aperture and a photodetector is located over the second aperture. At the first shaft rotates, the slot attenuates the light beam generated by the photosource. The photodetector detects this attenuated light beam and generates a signal which may be processed to determine the rotational position, velocity and acceleration of the first shaft in real time, and thus the rotational position, velocity and acceleration of the plate in real time.

The gimbal means is nested within and connected to the housing by third and fourth shafts. The gimbal means is mounted for rotation inside the housing. The gimbal means has two co-linear shafts which attach to the housing. The third and fourth shafts are firmly affixed to the gimbal means, the third and fourth shafts rotate in unison with the gimbal means rotation. The third and fourth shafts are oriented orthogonal and co-planar to the axis of the first and second shafts. The third and fourth shafts rotate at the attachment to the housing utilizing any of a variety of rotation means to assure free rotation. On the third shaft is located a second rotation sensor and on the fourth shaft is located a mass having the weight of the second sensor. The second rotation sensor is mechanically identical to the first rotation sensor, it is merely measuring rotation in different perpendicular planes. The third shaft passes through the center of the second rotation sensor, the second rotation sensor includes a housing enclosing a slotted disk wherein a slot is continuously varying about the circumference of the disk. The housing is generally cylindrical and includes a tubular side portion intermediate a third and fourth circular face. The two circular faces and slotted disk have a center. The third shaft passes through the center of the two circular faces of the housing and the slotted disk. The slotted disk is fixed to rotate with the third shaft. The third circular face center includes means to permit free rotation of the third shaft. This may include a race of roller bearings, or it may be a bushing with appropriate lubrication. The fourth circular face is affixed to the housing. A third aperture is located outside the housing on the third circular face and a fourth aperture is located outside the fourth circular face, both third and fourth apertures being co-linear with the slot of the slotted disk and defining a channel. A second photosource is located over the third aperture and a second photodetector is located over the forth aperture. At the third shaft rotates, the slot attenuates the light beam generated by the second photosource. The second photodetector detects this attenuated light beam and generates a second signal which may be processed to determine the rotational position, velocity and acceleration of the third shaft in real time, and thus the rotational position, velocity and acceleration of the gimbal means in real time.

Located on the plate may be a device such as a compass, laser or a gyroscope. The compass may be of the slotted disk type as discussed in applications Ser. No. 08/297,847 and 08/297,850 incorporated herein by reference. It may also be any type which generates a processable signal indicative of the direction the housing is oriented.

The signals generated by the first and second rotation sensors in combination with the signal generated by the compass, gyrocompass, or gyroscope will be sent to a signal processing circuit or a microprocessor. A separate speed sensor will provide the microprocessor with a signal proportional to the real time speed of the moving object. In the microprocessor and ancillary circuits the signals will be processed to generate a real time display of attitude and direction including vector quantities of a moving object to which the housing is attached. This information may be further sent to an automated control system or human operator in order to make decisions determining further controlled motion of the moving object, may be plotted against a known map of the area or saved to have record of a precise path travelled.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a apparatus which provides a real-time three dimensional velocity vector.

It is another object of the present invention to provide the rate of change of the angular position of the moving object.

It is a further objective of the present invention to provide an apparatus which may provide a real-time attitude and direction of a moving object, and may plot such against a known map, store such in such a fashion to have a record of the precise path the moving object travelled, or send such data to an automated control system or human operator in order to make decisions determining the further controlled motion of the moving object.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a gimballed holder for a device such as a compass, laser or gyroscope embodying the principles and concepts of the present invention will be described.

Figure 1:
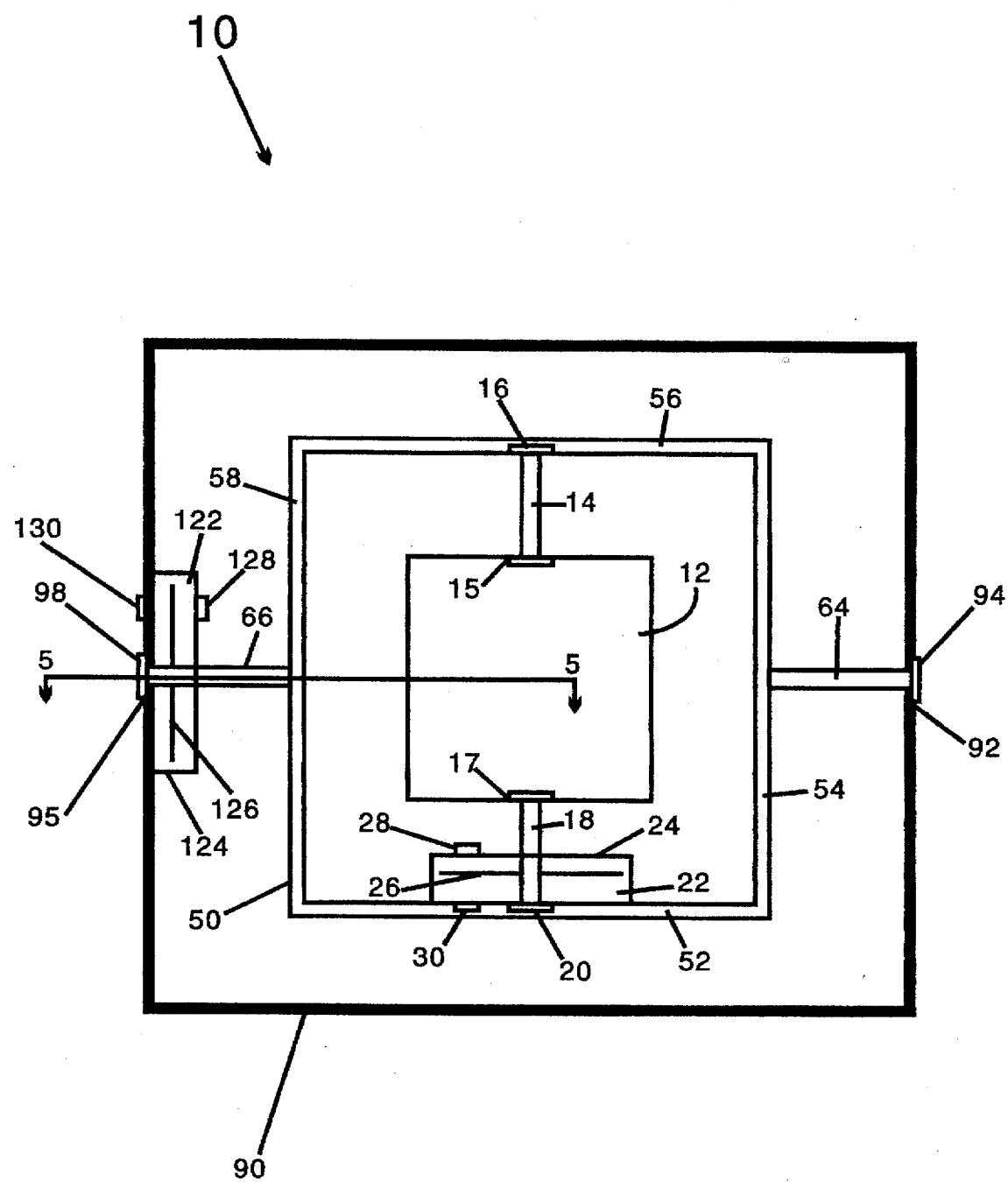
FIG. 1 is a top view showing the preferred embodiment of the apparatus of the invention.

Turning initially to FIG. 1, there is shown a first exemplary embodiment of the gimballed holder of the invention generally designated by reference numeral 10. In its preferred form, gimballed holder 10 comprises generally a mounting plate 12 nested in a frame 50, which is surrounded by a housing 90. The housing 90 will be affixed to a vehicle, such as an automobile, aircraft, maritime vehicle or other moving object. Frame 50 and mounting plate 12 are free to rotate and this rotation will be measured by sensors to determine the determine the instantaneous rotation about two perpendicular planes of the vehicle in a real-time fashion. Plate 12 may have a device such as a magnetic compass, flux gate compass or a sensor device as described below mounted thereon which would present real time directional information in the third plane.

Frame 50 is generally rectangular and comprises four side elements 52, 54, 56, and 58 respectively. First side element 52 is connected to second side element 54 and fourth side element 58. Second side element 54 is connected to third side element 56 and first side element 52. Third side element 56 is connected to fourth side element 58 and second side element 54. Fourth side element 58 is connected to first side element 52 and third side element 56.

A mounting plate 12 has a first shaft 14 depending from it. First shaft 14 is fixed to the mounting plate 12 in a rigid fashion by any suitable means at location 15. First shaft 14 is also connected to frame 50 at the approximate center of the third side element 56. First shaft 14 is freely rotatable at the connection to frame 50 on the third side element 56. A first shaft rotation means 16 is located at the connection point between the first shaft 14 and the frame 50 on its third side element 56. First shaft 14 is rotatably affixed to a first shaft rotation means 16. The first shaft rotation means 16 may be any suitable device which permits the free rotation of the first shaft 14.

Mounting plate 12 has a second shaft 18 depending from it. Second shaft 18 is fixed to the mounting plate 12 in a rigid fashion by any suitable means at location 17. Second shaft 18 is located on the opposite side and at the same location of the generally rectangular mounting plate 12 as is first shaft 14. First shaft 14 and second shaft 18 are co-linear. Second shaft 18 is connected to frame 50 at the approximate center of first side element 52. Second shaft 18 is freely rotatable at the connection to frame 50. Second shaft 18 is rotatably affixed to a second shaft rotation means 20. The second shaft rotation means 20 may be any suitable device which permits the free rotation of the second shaft 18.

The above configuration permits the mounting plate 12 to freely rotate 360 degrees within frame 50. This embodiment will include a rotation attenuator for the mounting plate 12, which will prevent its rotation beyond a certain preset parameter. In this fashion, the mounting plate 12 will be prevented from becoming inverted. The degree of rotation required of the mounting plate 12 will depending on the nature of the device mounted on thereon. It is also to be understood that the mounting plate 12 may be of any geometric configuration that is symmetric to a fashion, any geometric shape may be employed which permits the first shaft 14 and the second shaft 18 to be co-linear and oppositely secured to the mounting plate 12.

First sensor 22 is attached to frame 50 on first side element 52. A weighted element may be placed on first shaft 14. The weighted element 28 has the same mass as the slotted disk 26 and permits stability of the system. Second shaft 18 passes through the center of the first sensor 22. The first sensor 22 will be depicted in detail in subsequent figures. First sensor 22 includes a first sensor housing 24. The first sensor housing 24 is generally cylindrical and encloses a slotted disk 26. The disk 26 is circular and second shaft 18 passes through its center. Disk 26 is attached to second shaft 18, disk 26 will rotate with second shaft 18. The first sensor housing 24 as discussed in generally cylindrical. The first sensor housing 24 includes a tubular side portion intermediate 2 circular faces, all of the same diameter. The first sensor housing 24 may be filled with a damping liquid, the liquid further being transparent to radiation. On each of the circular faces exists a rectangular aperture. These apertures are co-linear and fall on the same radius line from their common centers. The width of the apertures being less than or equal to the distance between the minimum slot width and the maximum slot width. The apertures define a channel through the housing. Each of the apertures are covered with a transparent fluid-impervious membrane. A first photosource 28 is mounted above the first aperture 41, and a first photodetector 30 is mounted over the second aperture 43.

Disk 26 has a slot circumscribed about its circumference. The slot has a width, the width has a maximum and a minimum, and the width varies between those two values as one transits the circumference of the disk. No two points have the same width and the width diminishes at a constant rate as one transits the slot from the maximum to the minimum. The minimum slot width is zero and the slot is covered with a material which is transparent to radiance from the first photosource and provides stability to the disk. The maximum slot width is approximately equal to the length of the apertures. The slot is in the channel defined above, being fully intermediate the apertures and the first photosource 28 and photodetector 30. The disk 26 rotates with second shaft 18. As the second shaft 18 rotates, indicating a rotation of the mounting plate 12, the disk 26 rotates. The first photosource 28 generates an emission which is detected by the photodetector 30. This emission is attenuated by the slot of disk 26. As the disk 26 rotates, the amount of emission which is attenuated various as well. Therefore, the amount of emission detected by photodetector 30 is proportional directly to the disk 26 rotation. Photodetector 30 may be any photodetector known which generates an electrical signal which bears relation to the amount of light incident upon it. This includes, but is not limited to, a charged couple devices, photodiodes, cadmium sulfide or selenide detectors or other radiation detectors. The first photosource 28 and photodetector 30 will be chosen for the application and a detector will be chosen appropriate to the source. The electrical signal generated by the photodetector 30 will be processed by a microprocessor or other circuit to give real time information concerning the angular rotation and position the mounting plate 12 is experiencing. This real time information will be displayed in an appropriate format for a user of the system.

Frame 50 is nested within the housing 90. Frame 50 is also connected to the housing 90 by a third shaft 64 and a fourth shaft 66. The third shaft 64 is attached to second side element 54 at location 61. The fourth shaft 66 is attached to the fourth side element 58 at location 63. The third shaft 64 and the fourth shaft 66 are co-linear. Third shaft 64 is freely rotatable at the connection to housing 90 at location 92. A third shaft rotation means 94 is located proximal location 92.

Third shaft 64 is rotatably affixed to third shaft rotation means 94. The third shaft rotation means 94 may be any suitable device which permits the free rotation of third shaft 64.

Fourth shaft 66 is freely rotatable at the connection to housing 90 at location 95. A fourth shaft rotation means 98 is located proximal location 95. Fourth shaft 66 is rotatably affixed to fourth shaft rotation means 98. The fourth shaft rotation means 98 may be any suitable device which permits the free rotation of the fourth shaft 66.

The line connecting the third shaft 64 to the fourth shaft 66 is perpendicular to the line connecting the first shaft 14 to the second shaft 16. Frame 50 is free to rotate inside housing 90 and mounting plate 12 is free to rotate inside of frame 50. The rotation plane of the mounting plate 12 is fixed to be 90 degrees offset of the rotation plane of the frame 50.

Second sensor 122 is attached to frame 50 on fourth side element 58. A weighted element may be placed on the third shaft 64. The weighted element has the same mass as slotted disk 126 and permits stability of the system. Fourth shaft 66 passes through the center of the second sensor 122. The second sensor 122 will be depicted in detail in subsequent figures. Second sensor 122 includes a second sensor housing 124. The second sensor housing 124 is generally cylindrical and encloses a second disk 126. The second disk 126 is circular and the fourth shaft 66 passes through its center.

Second disk 126 is attached to fourth shaft 66, and the second disk 126 will rotate with the fourth shaft 66. The second sensor housing 124 as discussed in generally cylindrical. The second sensor housing 124 includes a tubular side portion intermediate 2 circular faces, all of the same diameter. The second sensor housing 124 may be filled with a damping liquid, the liquid further being transparent to radiation. On each of the circular faces exists a rectangular aperture. These apertures are co-linear being of width less than or equal to the distance between the minimum slot width and the maximum slot width. Said apertures define a channel through the housing; Each of the apertures are covered with a transparent fluid-impervious membrane. A first photosource 128 is mounted above the first aperture, and a photodetector 130 is mounted over the second aperture.

Second disk 126 has a slot circumscribed about its circumference. The slot has a width, the width has a maximum and a minimum, and the width varies between those two values as one transits the circumference of the disk. No two points have the same width and the width diminishes at a constant rate as one transits the slot from the maximum to the minimum. The minimum slot width is zero and the slot is covered with a material which is transparent to radiance from the photosource and provides stability to the disk. The maximum slot width is approximately equal to the length of the apertures. The slot is in the channel defined above, being fully intermediate the apertures and the second photosource 128 and photodetector 130. The second disk 126 rotates with fourth shaft 66. As the fourth axle 66 rotates, indicating a rotation of the frame 50, the second disk 126 rotates. The second photosource 128 generates a light beam which is detected by the photodetector 130. This light beam is attenuated by the slot of the second disk 126. As the second disk 126 rotates, the amount of light which is attenuated varies as well. Therefore, the amount of light detected by photodetector 130 is proportional directly to the second disk 126 rotation. Photodetector 130 may be any photodetector known which generates an electrical signal which bears relation to the amount of light incident upon it. This includes, but is not limited to, a charged couple device, a pin diode, a cadmium sulfide detector, or other radiation detector. The second photosource 128 and photodetector 130 will be chosen for the application and a detector will be chosen appropriate to the source. The electrical signal generated by the photodetector 130 will be processed by a microprocessor or other circuit to give real time information concerning the angular rotation and position the frame 50 is experiencing. This real time information will be displayed in an appropriate format for a user of the system.

Figure 2:
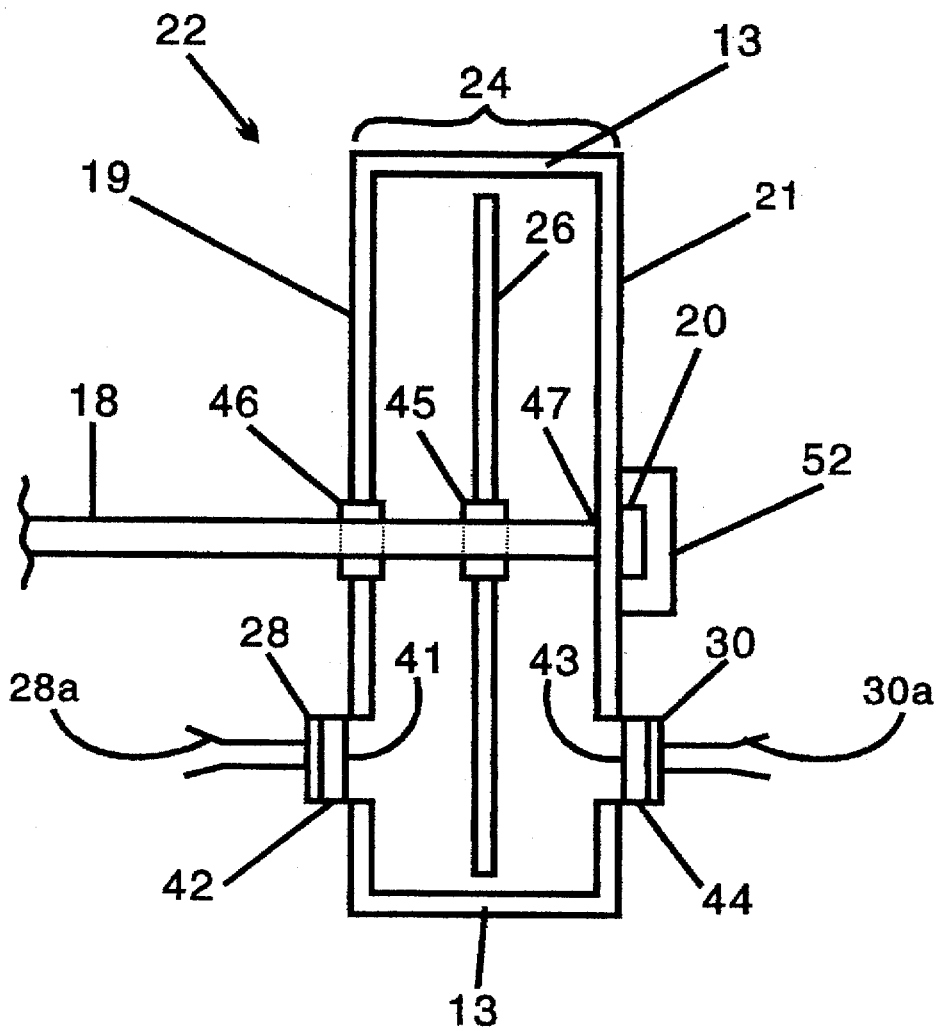
FIG. 2 is a cross-section through the first sensor disclosing interior structure.

Referring now specifically to FIG. 2 the first sensor 22 is shown attached to frame 50 on first side element 52. Second shaft 18 passes through the center of the first sensor 22. First sensor 22 includes a first sensor housing 24. The first sensor housing 24 is generally cylindrical and encloses a slotted disk 26. The disk 26 is circular and second shaft 18 passes through its center. Disk 26 is attached to second shaft 18, disk 26 will rotate with second shaft 18. The first sensor housing 24 as discussed in generally cylindrical. The first sensor housing 24 includes a tubular side portion 13 intermediate a first circular face 19 and a second circular face 21. Disk 26 is located in the center of the first sensor housing 24. On the first circular face 19 includes a first aperture 41. The second circular face 21 includes a second aperture 43. The first aperture 41 and the second aperture are co-linear and fall on the same radius line from the center of the circular faces on which they reside. The first aperture 41 and the second aperture 43 define a channel through the first sensor housing 24. A first photosource 28 is mounted above the first aperture 41. Intermediate the first photosource 28 and the first aperture 41 is a first collimator 42. A first photodetector 30 is mounted over the second aperture 43. Intermediate the first photodetector 30 and the second aperture 43 is a second collimator 44. Disk 26 is attached to second shaft 18 by attachment means 45. The first circular face 19 includes a means 46 to permit free rotation of second shaft 18. Second circular face 21 includes a second means 47 to permit the free rotation of second shaft 18. Second shaft 18 is rotatably affixed to a second shaft rotation means 20. Second shaft rotation means 20 is secured to first side element 52. First photosource 28 is connected to a power source (not shown) by power source connection means 28A. The power source connection means 28A may be wires or other electrical-power interface means. First photodetector 30 is connected to a microprocessor (not shown) or other signal processing means by a microprocessor connection means 30A. The microprocessor connection means 30A may be wires or other signal transmission devices.

Figure 3:
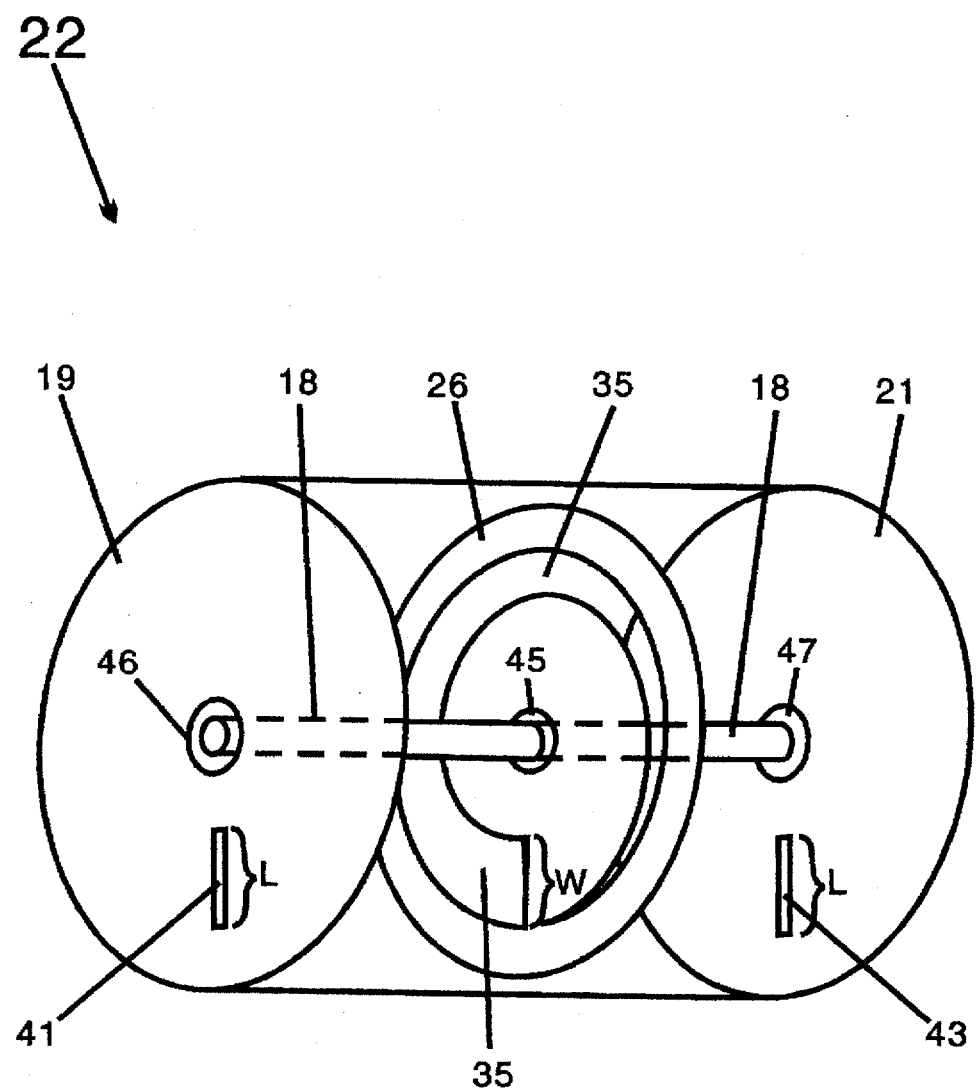
FIG. 3 is a break away isometric view of the first sensor showing its internal structure.
Figure 4:
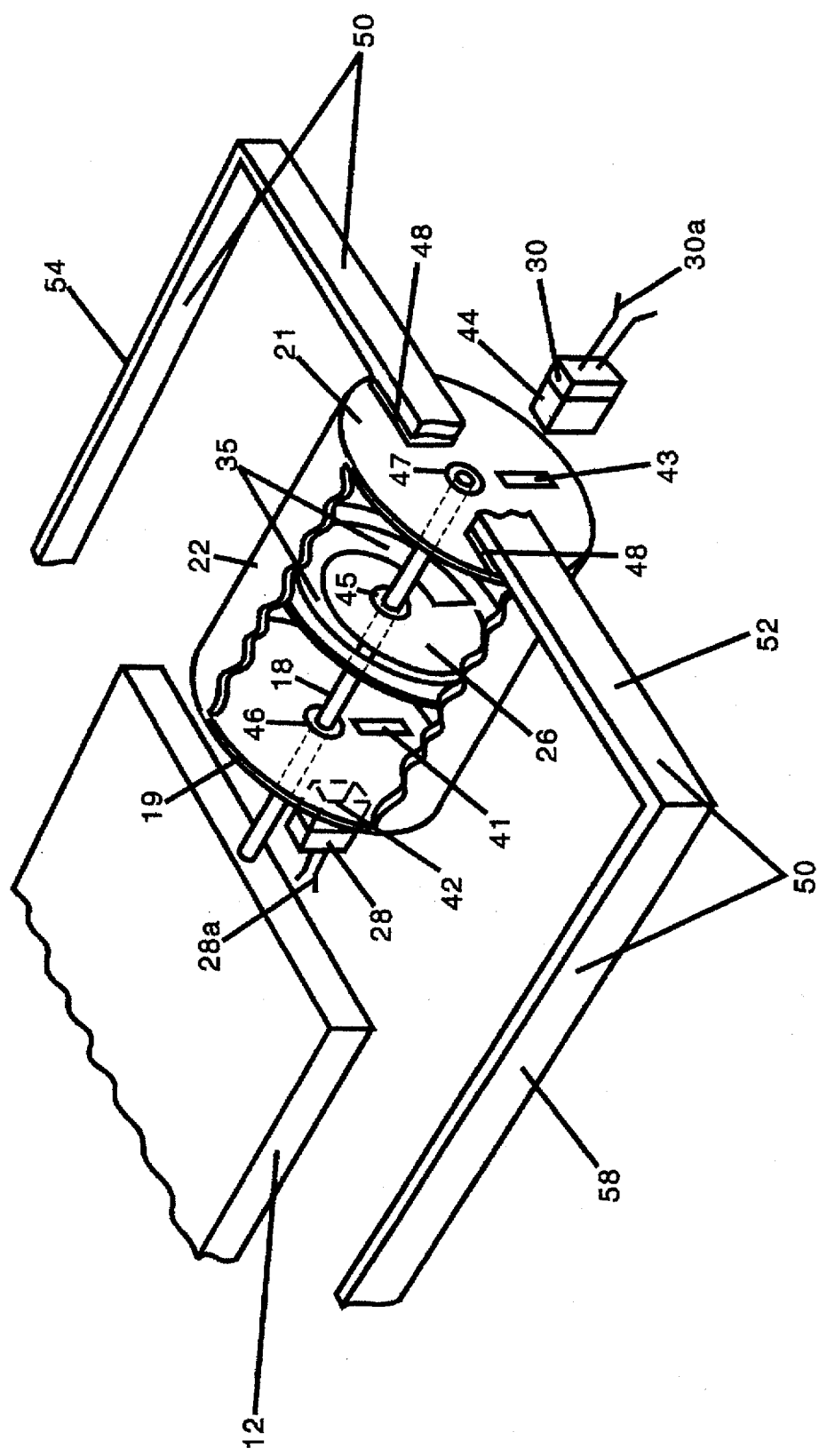
FIG. 4 is an exploded view of the first sensor illustrating the relationship between the apertures, the slotted disk and the attachment of the sensor to the frame.

Referring now to FIGS. 3 and 4, views of the first sensor 22 showing the internal structure is disclosed. Second shaft 18 is attached to disk 26 by attachment means 45. Disk 26 has a slot 35 circumscribed about its circumference. The slot 35 has a width, the width has a maximum and a minimum, and the width varies between those two values as one transits the circumference of the disk 26. No two points have the same width and the width diminishes at a constant rate as one transits the slot from the maximum to the minimum. The minimum slot width is zero and the slot is covered with a material which is transparent to radiance from the first photosource 28 and provides stability to the disk 26. The maximum slot width (W) is approximately equal to the length (L) of the first aperture 41 and second aperture 43. The slot 35 lies in the channel defined above, being fully intermediate the first aperture 41 and the second aperture 43. The disk 26 rotates with second shaft 18. As the second shaft 18 rotates, indicating a rotation of the mounting plate 12, the disk 26 rotates. The first photosource 28 (FIG. 4) generates an emission which is detected by the first photodetector 30 (FIG. 4). This emission is attenuated by the slot of disk 26. As the disk 26 rotates, the amount of emission which is attenuated varies as well. Therefore, the amount of emission detected by the first photodetector 30 is proportional directly to the disk 26 rotation. First sensor housing 24 is secured to frame 50 by a suitable first sensor attachment means 48.

It is understood that the second sensor 122 is mechanically equivalent and functions precisely as the first sensor 22 described above. The second sensor 122 is affixed to the housing 90 of the invention whereas the first sensor 22 is attached to the frame 50.

Figure 5:
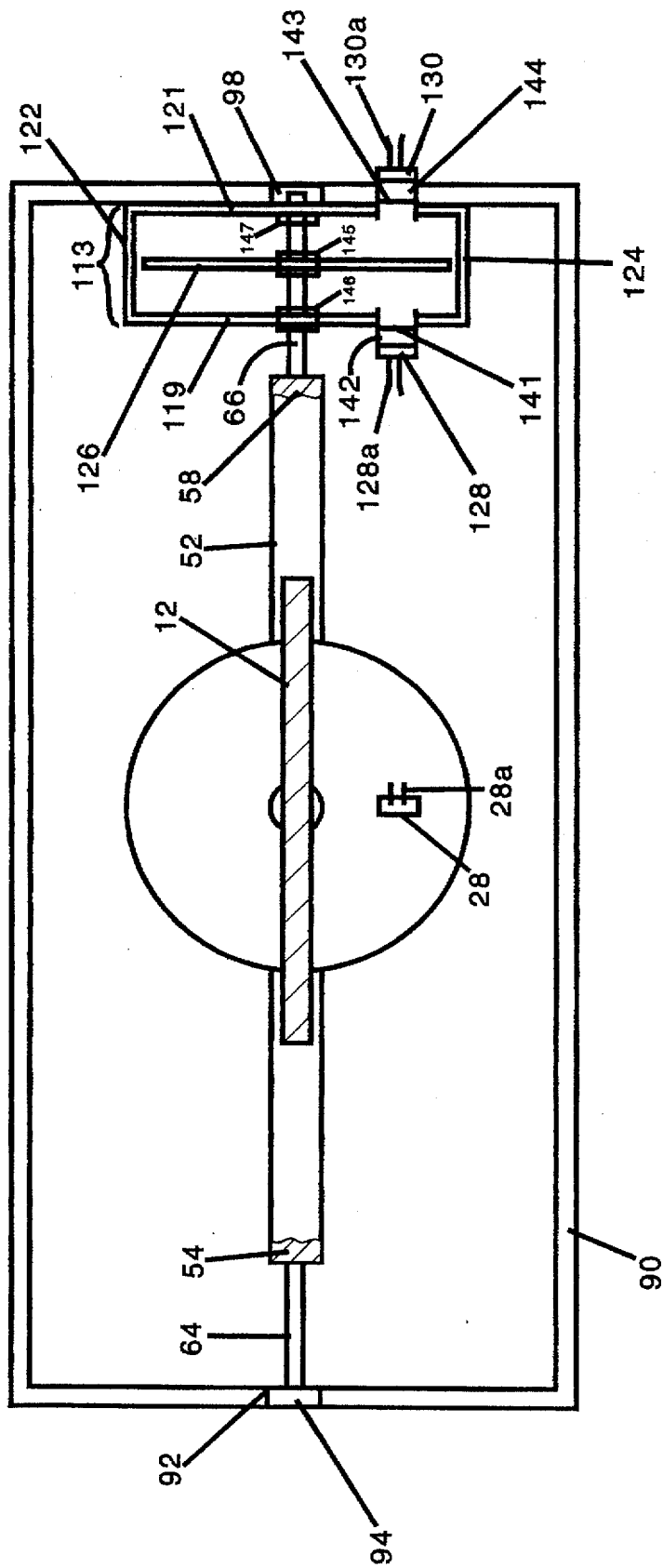
FIG. 5 is a view of the instant invention taken across line 5—5 of FIG. 1 showing the second sensor.
Figure 6:
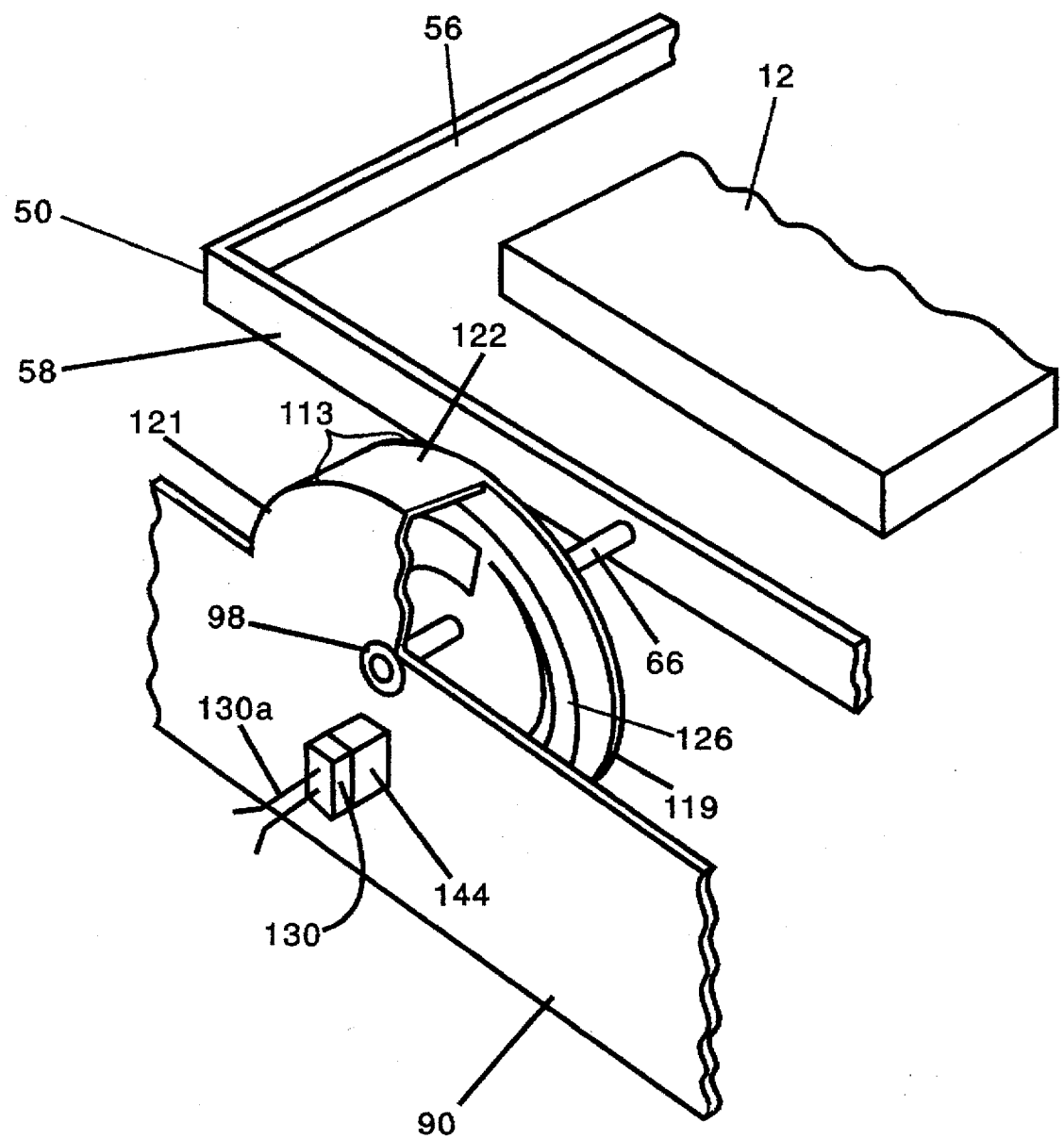
FIG. 6 is an illustration of the second sensor attached to the housing.

Referring now specifically to FIGS. 5 and 6, the second sensor 122 is shown attached to housing 90. Fourth shaft 66 passes through the center of the second sensor 122. Second sensor 122 includes a second sensor housing 124. The second sensor housing 124 is generally cylindrical and encloses a second slotted disk 126. The second disk 126 is circular and fourth shaft 66 passes through its center. Second disk 126 is attached to fourth shaft 66, second disk 126 will rotate with fourth shaft 66. The second sensor housing 124 as discussed in generally cylindrical. The second sensor housing 124 includes a tubular side portion 113 intermediate a third circular face 119 and a fourth circular face 121. Second slotted disk 126 is located in the center of the second sensor housing 124. On the third circular face 119 includes a third aperture 141. The fourth circular face 121 includes a fourth aperture 143. The third aperture 141 and the fourth aperture 143 are co-linear and fall on the same radius line from the center of the circular faces (119 and 121) on which they reside. The third aperture 141 and the fourth aperture 143 define a channel through the second sensor housing 124. A second photosource 128 is mounted above the third aperture 141. Intermediate the second photosource 128 and the third aperture 141 is a third collimator 142. A second photodetector 130 is mounted over the fourth aperture 143. Intermediate the second photodetector 130 and the fourth aperture 143 is a fourth collimator 144. Second slotted disk 126 is attached to fourth shaft 118 by second shaft attachment means 145. The third circular face 119 includes a means 146 to permit free rotation of fourth shaft 118. Fourth circular face 121 includes an another means 147 to permit the free rotation of fourth shaft 118. Fourth shaft 118 is rotatably affixed to a fourth shaft rotation means 98. Fourth shaft rotation means 98 is secured to housing 90. Second photosource 128 is connected to a power source (not shown) by second power source connection means 128A. The second power source connection means 128A may be wires or other electrical-power interface means. Second photodetector 130 is connected to a microprocessor (not shown) or other signal processing means by a microprocessor connection means 130A. The microprocessor connection means 130A may be wires or other signal transmission devices.

Figure 7:
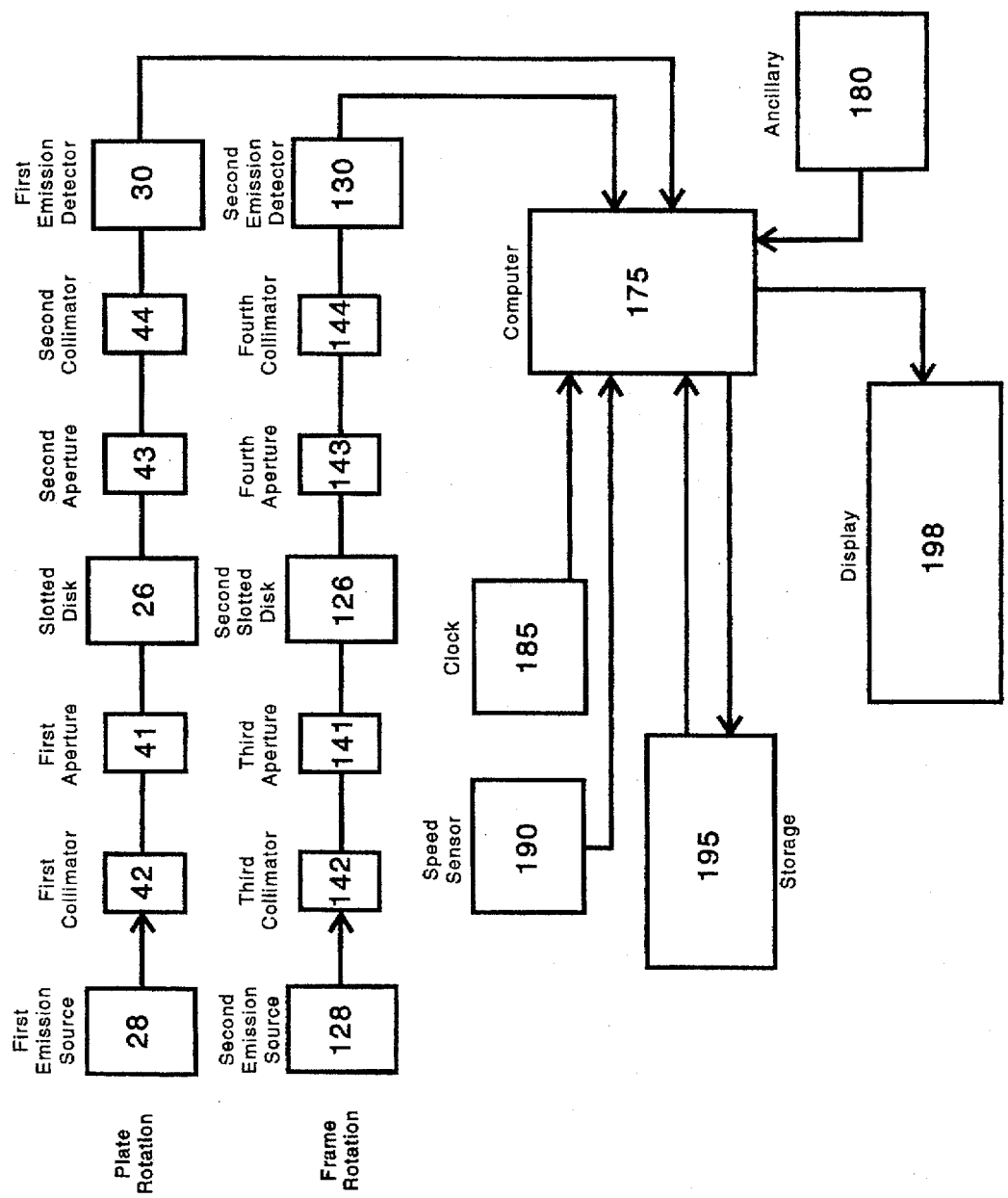
FIG. 7 is a schematic diagram of the logic employed in measuring the photo-intensity for each plane of motion.

FIG. 7 is a block diagram charting the emission paths in the first sensor 22, and the second sensor 122, as well as the other components utilized in the instant invention to permit the determination of real-time three dimensional positional orientation and the instant velocity vector. Plate 12 rotation is determined by a first rotation sensor 22. The first sensor 22 includes a first photosource 28 which generates a first emission. That first emission travels through the first collimator 42, and then through the first aperture 41. The first emission then travels into the interior of the first housing 24 and passes through the first slotted disk 26. The first slotted disk 26 attenuates the emission in a direct proportion to the plate 12 instant position. The attenuated emission then travels through the second aperture 43, through the second collimator 44 and into the first photodetector 30. The first photodetector 30 generates a signal proportional to the emission incident upon its sensitive surface. This signal travels to computer 175.

Frame 50 rotation is determined by a second rotation sensor 122. The second sensor 122 includes a second photosource 128 which generates a second emission. That second emission travels through the third collimator 142, and then through the third aperture 141. The second emission then travels into the interior of the second housing 124 and passes through the second slotted disk 126. The second slotted disk 126 attenuates the second emission in a direct proportion to the plate 12 instant position. The attenuated second emission then travels through the fourth aperture 143, through the fourth collimator 144 and into the second photodetector 130. The second photodetector 130 generates a signal proportional to the emission incident upon its sensitive surface. This signal travels to computer 175.

A compass 180 provides a signal to the computer 175 proportional to the instant direction of the object. The compass 180 would be mounted on plate 12.

A speed sensor 190 provides the computer 175 with a signal proportional to the instant speed of the object.

A clock 185 provides a time pulse to the computer 175. This clock 185 permits the computer to associate a time value to data from the other sensor input devices. A storage means 195 is used for storage and recall to permit calculations. A display 198 would be an output of real time information concerning the attitude and orientation of the moving object.

Figure 8:
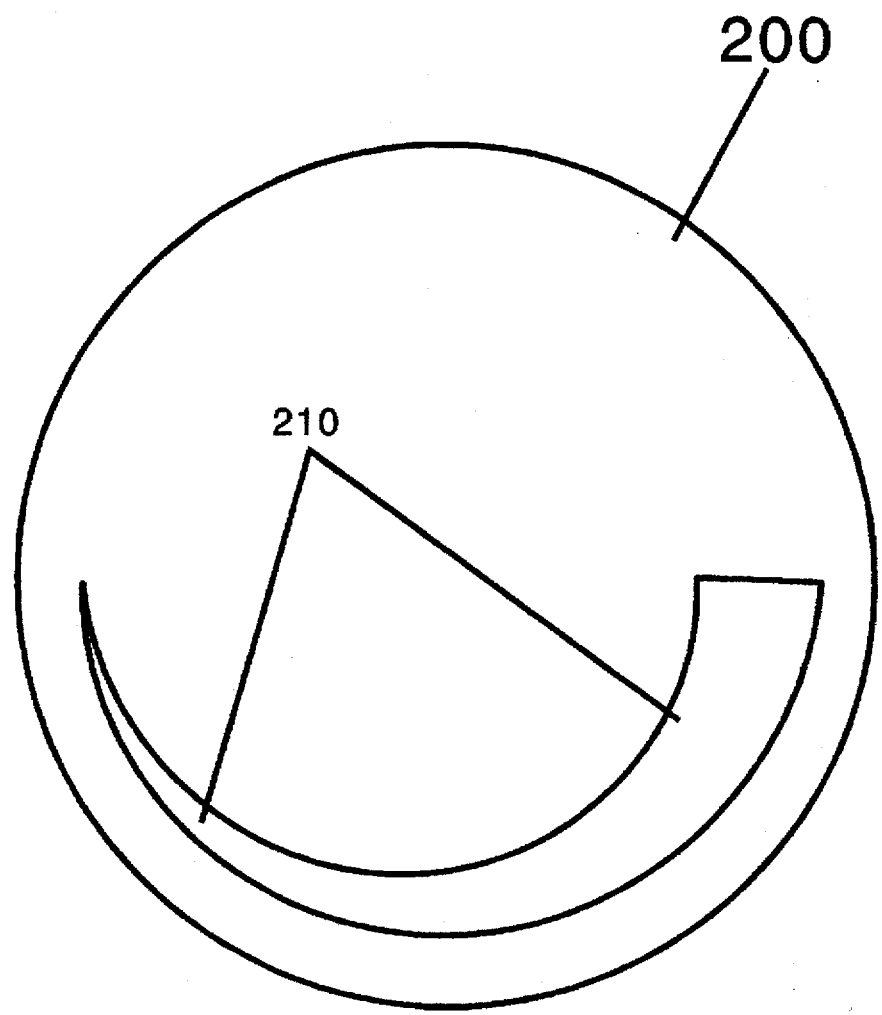
FIG. 8 is an illustration of an alternate embodiment of the invention wherein the slotted disk moves through an angle of only 180°.

FIG. 8 discloses a disk 200. The disk 200 has a slot 210 circumscribed 180 degrees about the circumference. This disk 200 may be employed in other applications, including measurement of angle of inclination of a body. This disk 200 may replace any of the aforementioned disk elements. The apertures must be appropriately placed on the sensor housing in order to permit the slot 210 to attenuate a emission from an emission source.

It is apparent from the above that the present invention accomplishes all of the objectives set forth by providing an apparatus which may provide a real-time attitude and direction of a moving object, and may plot such against a known map, store such in such a fashion to have a record of the precise path the moving object travelled, or send such data to an automated control system or human operator in order to make decisions determining the further controlled motion of the moving object.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

I claim:

1. An apparatus for determining the real-time orientation and direction of an object which may be moving through space comprising:

a plate and a frame member, said plate nested within said frame member, said plate connected to said frame member by a first and second shaft member, said first shaft member and said second shaft member being attached to opposite sides of said plate and said first shaft member and said second shaft member further being rotatably connected to said frame member, permitting free rotation of said plate inside of said frame member, a housing, said frame member connected to said housing by a third and fourth shaft member, said third shaft member and said fourth shaft member being attached to opposite sides of said frame and said third shaft member and said fourth shaft member being further rotatably connected to said housing, permitting free rotation of said frame inside of said housing, a first sensor, said first sensor mounted on said second shaft, said first sensor including a first disk, said first disk located intermediate a first photosource and a first photosensor, a second sensor, said second sensor mounted on said fourth shaft, said second sensor including a second disk, said second disk located intermediate a second photosource and a second photosensor, said first disk including a first slot, said first slot proximal to the circumference of said first disk and defining a first passage through said first disk, said first passage having a first width, said first width varying about the circumference of said first disk, said first photosource generating a first photo-emission and said first passage permitting a first portion of said first photo-emission to pass therethrough, said first portion dependent on the position of said first disk, said first potion being detected by said first photosensor, said first photosensor generating a first signal proportional to a first rotation of said plate, said second disk including a second slot, said second slot proximal to the circumference of said second disk and defining a second passage through said second disk, said second passage having a second width, said second width varying about the circumference of said second disk, said second photosource generating a second photo-emission and said second passage permitting a second portion of said second photo-emission to pass therethrough, said second portion dependent on the position of said second disk, said second potion being detected by said second photosensor, said second photosensor generating a second signal proportional to a second rotation of said frame member, a data processing means, said data processing means permitting said first and second signal to be processed, whereby said apparatus is attached to said object and precise real-time orientation of said object is obtained by the processing of said first signal and said second signal.

2. An apparatus as claimed in claim 1 including a speed sensor for determining the speed of said object, said speed sensor generating a speed signal proportional to the speed of said object, said speed signal being processed by said data processing means with said first signal and said second signal to provide a real-time velocity vector and speed information.

3. An apparatus as claimed in claim 2 wherein said apparatus further includes a clock means, said clock means generating a time signal, said time signal being processed by said data processing means.

4. An apparatus as claimed in claim 3 wherein said apparatus includes a compass, said compass providing a directional signal proportional to the direction of said object, said directional signal being processed by said data processing means to provide real-time directional information.

5. An apparatus as claimed in claim 4 wherein said data processing means includes data storage and retrieval means.

6. An apparatus as claimed in claim 5 wherein said data processing means includes a computer.

7. An apparatus as claimed in claim 6 wherein said computer generates real-time orientation and directional information for said object, and displays the real-time orientation and directional information on a display means.

* * * * *